Nov. 30, 1926.
J. J. BROPHY
1,609,057
SPEED REGULATOR FOR MOTOR VEHICLES
Filed July 12, 1923   3 Sheets-Sheet 2
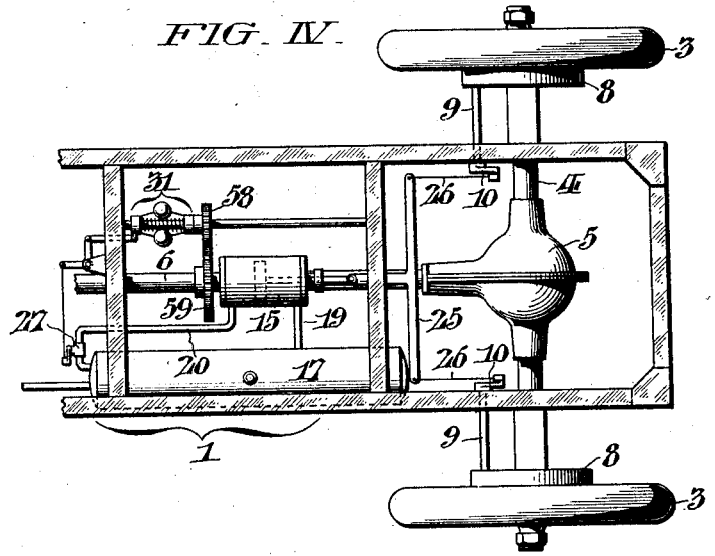
FIG. IV.
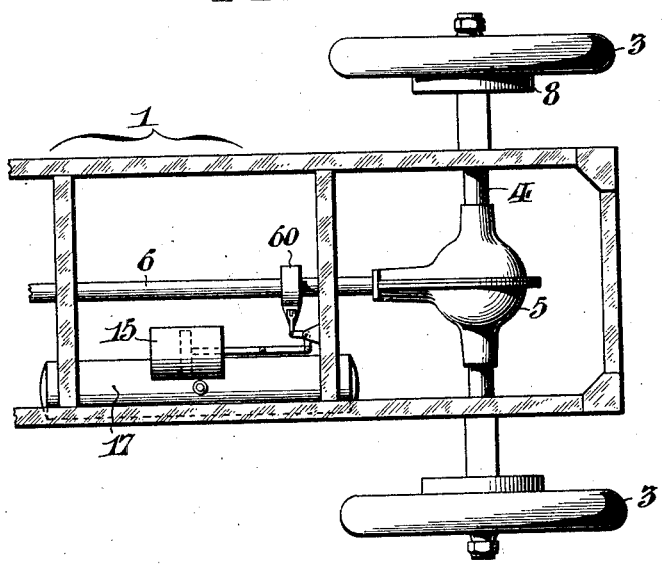
FIG. V.
WITNESSES:
INVENTOR:
John J. Brophy,
BY
ATTORNEYS.

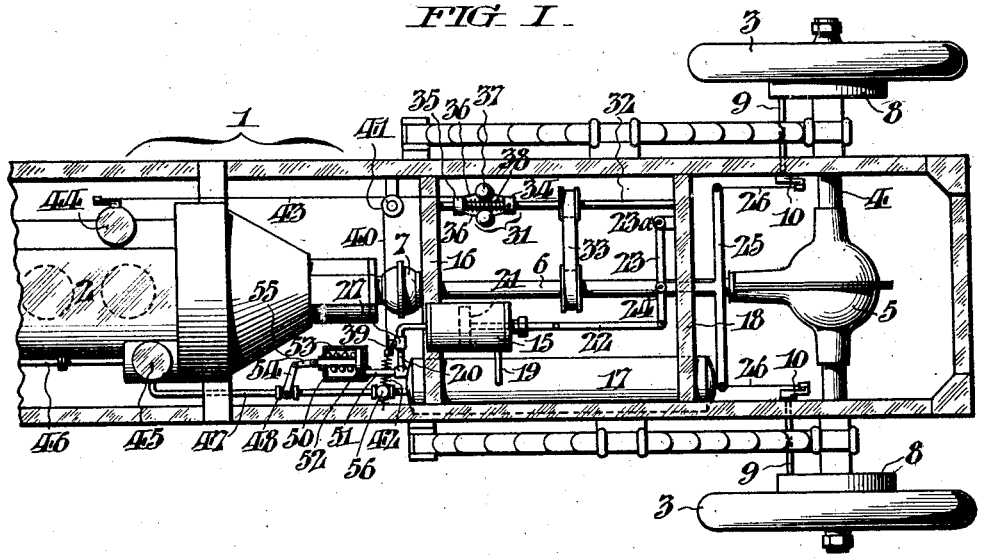

Nov. 30, 1926.
J. J. BROPHY
1,609,057
SPEED REGULATOR FOR MOTOR VEHICLES
Filed July 12, 1923    3 Sheets-Sheet 3
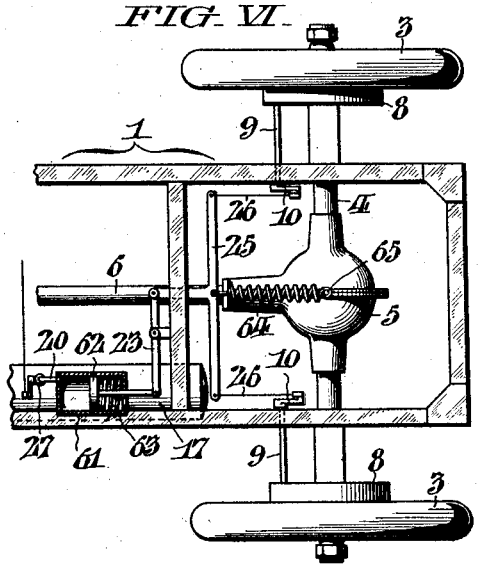
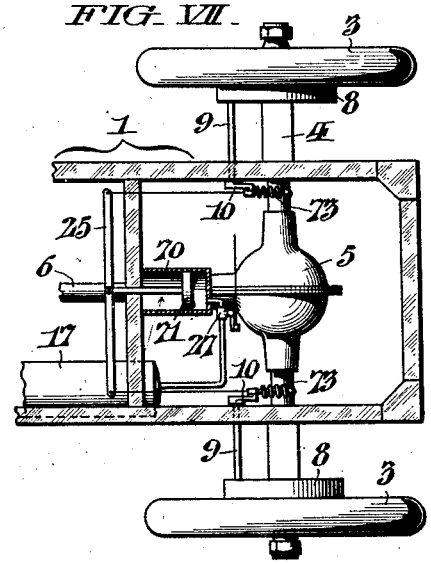
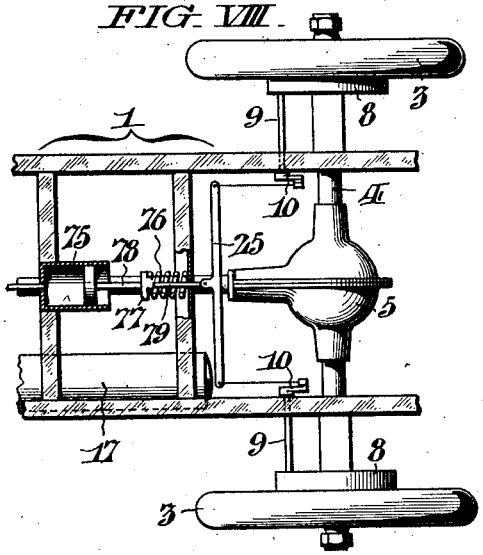
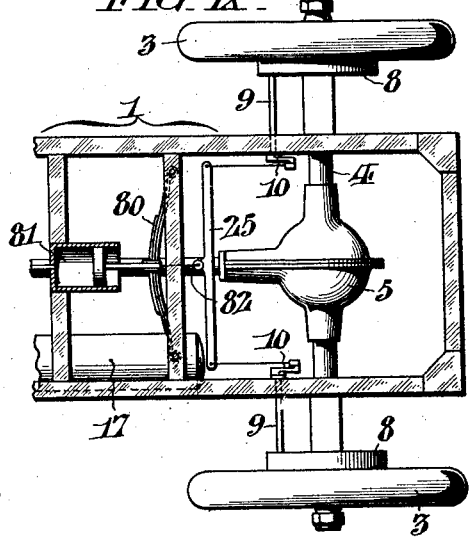
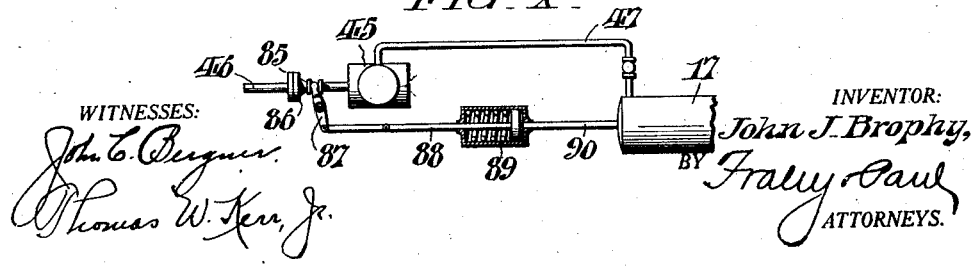

Patented Nov. 30, 1926.

1,609,057

UNITED STATES PATENT OFFICE.

JOHN J. BROPHY, OF PHILADELPHIA, PENNSYLVANIA.

SPEED REGULATOR FOR MOTOR VEHICLES.

Application filed July 12, 1923. Serial No. 651,015.

My invention relates to speed regulators for motor vehicles, and is directed primarily toward provision of reliable means capable of automatically diminishing or suspending the supply of fuel to the engine as well as setting the brakes when the vehicle attains a predetermined speed or momentum, and of maintaining these conditions until the rate of travel is decreased to a point below such predetermined critical speed.

Other objects of my invention are to provide automatic mechanism of the character stated, which mechanism is entirely independent of the control of the operator of the car so as to be absolutely fool-proof; which is subject only to vehicular speed and therefore independent of variations in the speed of the engine or motor; and which is operative notwithstanding the disconnection of the motor clutch as in coasting.

The foregoing and other objects will become readily apparent from the detailed description which follows of typical embodiments of my invention, while its scope, in so far as comes within my present knowledge, is clearly defined by the appended claims.

In the drawings, Fig. I is a partial plan view of a motor vehicle conveniently embodying an automatic speed regulating mechanism in accordance with one of the possible forms and arrangements of this invention.

Fig. II is a similar view, though somewhat more condensed, of a slightly modified embodiment of my invention.

Fig. III is a detail sectional view, on an enlarged scale, of the valve which controls the fluid pressure cylinder whereby the brakes are actuated.

Figs. IV to IX inclusive are further modified embodiments of my invention which will be hereinafter separately described and differentiated; and Fig. X is a detail view of a modified means for automatically controlling the pressure in the supply tank forming a part of my improved mechanism.

Referring first to Fig. I, the chassis of a motor vehicle is therein comprehensively indicated by the numeral 1, the same supporting, at its forward end, a motor 2 conventionally represented as being of internal combustion type. The chassis 1 further includes the rear wheels 3—3 which are mounted upon opposite ends of the axle 4 wherewith is incorporated at its center, a housing 5 protecting the differential gears whereby said rear axle is driven from the propeller shaft 6. The propeller shaft 6 is connected by means of the usual type of universal ball coupling 7 with the shaft of the engine 2 in the well known manner. The wheels 3—3 are equipped with brake bands 8 arranged to be actuated through rock shafts 9 whereto are attached, at their inner ends, crank arms 10 all of which are of standard design.

As a means for effecting automatic application of the brakes I have herein shown a fluid pressure cylinder 15, adapted to employ any appropriate motive fluid, preferably compressed air, which may be rigidly secured in any convenient manner, for example, to one of the transverse braces 16 of the chassis 1. A constant supply of this motive fluid is automatically maintained, as hereinafter noted, in a storage tank 17 hung between the brace 16 aforesaid and a similar relatively spaced companion brace 18, the motive fluid being conducted to opposite ends of the cylinder 15 through pipes 19 and 20 respectively. The piston 21 of the cylinder is coupled, by means of a link 22, with a power multiplying lever 23 shown as fulcrumed at 23$^a$ to a lug projection of the transverse brace 18. This lever 23 has pivotal connection 24, at a point intermediate its ends, with a draft bar 25 whose opposite extremities are in turn coupled, by cables or rods 26, with the crank arms 10 hereinbefore described as associated with the brake bands 8. As long as pressure is maintained in both ends of the cylinder 15, the piston 21 will obviously occupy a neutral position determined by the usual springs (not shown) incorporated in the brake band assemblages. When, however, the supply of motive fluid to the left hand end of the cylinder 15 is cut off and that end permitted to exhaust to the atmosphere, it will be apparent that by virtue of maintenance of a constant supply to the opposite end of the cylinder through the pipe 19, said piston will be forced to the left, thus drawing upon the lever 23 and in turn upon the draft bar 25, thereby setting the brakes to retard the movement of the vehicle. Such control of the cylinder 15 I effect through the instrumentality of a valve 27 interposed in the pipe 20. This valve 27 may be of any approved type suitable to the purpose, such for example as shown in Fig. III wherein the same is illustrated in the position which it normally occupies to establish communication through the pipe 20 between the left hand end of the cylinder 15 and the storage tank 17. When the valve 27 is turned through ninety degrees in the direction of the arrow in the illustration last referred to, its lateral port 28 is brought into registry with that branch of the pipe 20 which directly communicates with the cylinder 15. As a result, the cylinder 15 is exhausted to the atmosphere through the main port 29 of the valve 27, the latter port 29 registering at this time with the discharge outlet 30 of the valve 27, while the supply from the tank 17 is concurrently interrupted. For the purpose of actuating the valve 27, I provide a governor of the centrifugal fly-ball type generally indicated by the numeral 31 in Fig. I. This governor 31 is, in the present instance, mounted upon a shaft 32 journalled in appropriate bearings afforded or supported by the transverse braces 16 and 18 of the chassis frame 1, and is coordinated with the propeller shaft 6 by a belt connection shown at 33. The governor 31, it will be noted, is of standard construction, comprising a fixed collar 34 and a relatively movable collar 35, which collars are connected by means of flexible members or links 36 whereto the fly balls 37 are attached. The collars 34, 35 are normally urged in a direction away from one another by means of a coiled compression spring 38 encircling the shaft 32 in the interval between them. Obviously, as the speed of the shaft 32 increases beyond a certain predetermined rate, outward movement of the balls 37 of the governor 31 will result in the approach of the movable collar 35 toward the fixed collar 34, and the motion thus derived is transmitted to the lever 39 of the valve 27 through the medium of a chain or cable 40 that is trained about a directional idler pulley 41 appropriately supported for free rotation by the chassis frame 1. A contractile spring 42 directly connected to the valve actuating lever 39 serves to maintain the valve 27 in the normal position illustrated.

In order to slow down the motor 2 at or about the time the brakes are applied, I extend a branch cable or chain connection 43 from the cable 40—previously referred to—to the throttle valve arm of the carburetor conventionally indicated at 44. This throttle may be either the main throttle of the carburetor or one operating in an auxiliary capacity thereto.

Compressed air, when employed for the system, is generated by a pump conventionally represented at 45 mounted in an appropriate manner to the engine casing, and arranged to be constantly driven from any convenient source, for example a shaft 46 geared or otherwise coordinated with the engine shaft. This pump 45 delivers the compressed air to the storage tank 17 through a pipe 47 wherein is interposed a control valve 48, which may be of a type similar to the valve 27 previously described, adapted to shut off communication with the tank 17, and at the same time, open that portion of the pipe 47—which extends to the pump 45 to the atmosphere so that said pump may run idle as long as a predetermined degree of pressure obtains in the storage tank 17. This predetermined pressure condition is automatically governed by a cylinder 50 which is connected directly with the storage tank 17 through a pipe 51, pressure tending to force the piston 52 of this cylinder outward, in opposition to the compressive force of a spring 53. Movements of the piston 52 serve to effect actuation of the lever 54 of the valve 48 through the medium of an interposed link 55. Outflow of compressed air from the storage tank 17 through the pipe 47 is prevented by provision in said pipe of a check valve 56.

The operation of the aforedescribed embodiment of my invention is as follows: In normal running of the car up to a critical rate of speed predetermined upon, the various parts of the mechanism occupy the respective positions shown in Fig. I. As soon however as the predetermined speed is exceeded through any cause whatsoever, as for example, through acceleration due to speeding, or to travel down-hill, the governor 31 immediately expands and functions, as already explained, to shift the valve 27 thereby shutting off the supply of motive fluid to the left hand end of the cylinder 15, simultaneously relieving that end to exhaust, and allowing pressure in the opposite end of the cylinder to act upon the piston 21. Movement of the piston 21 is in turn transmitted to the draft-bar 25 and thereby communicated to the brakes 8. At the same time, movement of the cable or chain 40 imparted to the extension 43, results in closing the throttle of the carburetor 44 thereby decreasing or intercepting supply of the fuel to the engine 2.

Attention is especially directed to the fact that governing of the cylinder 15 is dependent solely upon the speed of rotation of the propeller shaft 6, or—in other words, to the rate of vehicular travel as distinguished from the speed of the engine 2. It therefore follows that my improved speed regulating mechanism will function under all conditions of service notwithstanding disconnection of the engine clutch or the gears whereby the engine power is transmitted to the propeller shaft 6. Moreover, by reason of this distinction, the engine 2 may be driven at very high speed as required when the gears are shifted to low as in hill climbing, without causing the automatic speed regulating mechanism to function as would be the case if this mechanism were controlled through connections directly with the engine shaft.

The modification shown in Fig. II is substantially identical to that of Fig. I with corresponding parts identified by similar reference numerals, the only departures being the elimination of the shaft 32; mounting of the governor 31 directly upon the propeller shaft 6 of the vehicle; and interposition of a bell crank lever 57 between the movable collar 35 of the governor 31 aforesaid and the control valve 27 of the pressure cylinder 15. The operation of this form of my invention is in all respects the same as that described of the previous embodiment and separate description is therefore omitted to avoid unnecessary repetition.

In the modification of Fig. IV the cylinder 15 is directly connected to the draft bar 25 of the brake mechanism and the power multiplying lever 23 entirely dispensed with. One other difference between the form under present consideration and that of Fig. I resides in the use of intermeshing spur gears 58 and 59 for driving the auxiliary shaft 32 from the propeller shaft 6. Any other differences are of arrangement only and are obvious without further detailing.

Fig. V shows the use of a brake band 60 directly upon the propeller shaft 6, said brake band being actuated by the cylinder 15 through a slightly modified system of leverages.

In the organization of Fig. VI, I employ a single acting cylinder 61 which is normally open to the atmosphere but functions when motive fluid is admitted to the same by automatic operation of the valve 27, to effect application of the brakes through the medium of lever 23 and the draft bar 25. A compression spring 63 in the open end of the cylinder operates to normally maintain the piston 62 in its inner position and to keep the brakes 8 in released position. In the latter office, the spring 63 is assisted by a contractile spring 64 directly active upon the draft bar 25, and extending from the latter to a fixed point of anchorage 65 preferably on the differential gear casing 5.

The modification of Fig. VII operates on exactly the same principle as the previous embodiment; but here the piston 71 of the single acting cylinder 70 is directly connected to the draft bar 25. As will be obvious from the illustration, admission of motive fluid to the cylinder 70 will result in setting the brakes 8 in opposition to springs 73 which are effective upon the brake arms 10 and serve normally to hold said brakes released.

In the construction shown in Fig. VIII I make use of the cylinder 75 to normally oppose a compression spring 76 which acts against a head 77 attached to the outer end of the piston rod 78. This head 77 is coupled by means of a link 79 with the draft bar 25, so that when the pressure is exhausted from the cylinder 75, the spring 76 is released to exert its power in effecting application of the brakes 8.

In Fig. IX the operation is exactly the same as in the form just described; but, instead of using a coiled spring, I employ in this instance a compounded leaf spring 80 which is normally opposed by the cylinder 81, but when the pressure is released from the latter, the inherent power of the spring 80 serves to induce pull upon a cable or chain 82 connecting the same with the draft bar 25.

As an alternative means for preventing accumulation of excessive pressure in the storage tank 17, I may employ the organization shown in Fig. X. Here, in lieu of the valve 48 shown in the complete organization of Fig. I, I substitute a clutch 85 which is interposed in the shaft 46 whereby the compressor pump 45 is driven. The movable member 86 of this clutch is shiftable by means of a rocker arm 87 coupled with the piston rod 88 of a cylinder 89 which communicates with the tank 17 through a pipe 90. The operation of this cylinder 89 is precisely the same as that of the cylinder 53, (of the structure shown in Fig. I). Accordingly, as the pressure accumulates in the tank 17, the piston will be moved forward in the cylinder 89, thereby shifting the rocker arm 87 to separate or disengage the members of the clutch 85 and thereby to cause disconnection of the pump 45. It is of course to be understood that any of the alternative forms of brake mechanism may be used in association with the throttle control shown in Fig. I so as to bring about decrease of engine speed concurrently with application of the brakes when the predetermined rate of vehicular travel is exceeded as already explained.

Instead of using the propeller shaft 6 as the source of motion for my improved speed control device I may employ any other part the movement of which is relative to the vehicular speed of the car, for instance the wheels 3—3. The use of a single three-way valve 27 to control the fluid pressure cylinder is of course not necessarily essential to my invention since two separate valves properly coordinated may obviously be used in its stead to jointly perform the same function. It is also to be understood that my invention is not restricted to the joint functions of shutting off the fuel supply and applying the brakes since either may be accomplished thereby independent of the other. It will also be obvious that my invention may be adapted with advantages equal in all respects to those herein pointed out, in connection with vehicles wherein, instead of an internal combustion motor, other prime movers such as steam engines or electric motors, are used. In the former of these instances, the governor would serve to control the throttle or other valve to shut off wholly or partially the supply of steam to the engine. In the latter instance the governor would be employed to control a switch or its equivalent interposed in the motor circuit. In conclusion I wish to point out that the braking action need not be confined solely to the rear wheels, since provisions similar to those hereindescribed may be associated with the front wheels of the vehicle without departing from the spirit of my invention.

Having thus described my invention, I claim:

1. In a vehicle propelled by an internal combustion motor, the combination of a storage tank, means maintaining a constant supply of fluid pressure therein, draft mechanism for applying brakes to the vehicle wheels, and fly-ball governor influenced means automatically controlling the operation of the fluid pressure mechanism to simultaneously apply the brakes and close the motor carburetor throttle when a predetermined vehicular speed is attained.

2. In a vehicle propelled by an internal combustion engine, the combination of a storage tank, a compressor pump for maintaining a constant supply of fluid pressure therein, draft mechanism operable by the fluid pressure to apply brakes to the vehicle wheels, and means for throttling operation of the engine carburetor and at the same time applying the fluid pressure actuated brakes when a predetermined vehicular speed is attained.

3. In a vehicle propelled by an internal combustion engine, the combination of a storage tank, a compressor pump for maintaining a constant supply of fluid pressure therein, draft mechanism functional to apply and release the vehicle brakes, and fly-ball governor-influenced means coordinated with a driven part of the vehicle—the movement of which is directly related to the vehicular speed—and operative to automatically effect application of the brakes as well as close the engine carburetor throttle when a predetermined vehicular speed is attained.

4. In a vehicle propelled by an internal combustion engine, the combination of a storage tank, a compressor pump for maintaining a constant supply of fluid pressure therein, a fluid pressure cylinder and draft mechanism functional to actuate the vehicle brakes, and a fly-ball governor control coordinated with a part of the vehicle—the movement of which is directly related to the vehicular speed—for throttling operation of the motor carburetor and at the same time causing automatic application of the brakes when a predetermined rate of vehicular speed is attained.

5. In a vehicle propelled by an internal combustion engine, the combination of a storage tank, a compressor pump for maintaining a constant supply of fluid pressure therein, a fluid pressure cylinder and draft mechanism functional to actuate the vehicle brakes, and a fly-ball governor control coordinated with the propeller shaft of the vehicle for causing the automatic suspension of fuel supply to the engine carburetor and application of the brakes when a predetermined vehicular speed is attained.

6. In a vehicle propelled by an internal combustion engine, the combination of a storage tank, a compressor pump for maintaining a constant supply of fluid pressure therein, a double-acting cylinder having a piston adapted to be actuated by the fluid under pressure and coordinated with the vehicle brakes, a power multiplying lever interposed between the cylinder piston and the brakes, and means directly subject to vehicular speed for automatically controlling the cylinder to effect application of the brakes and throttling of the engine carburetor when a predetermined vehicular speed is attained.

7. In a motor vehicle, the combination of a storage tank, a compressor pump for maintaining a constant supply of fluid pressure therein, a cylinder having a piston adapted to be actuated by the fluid under pressure and operative to control the brakes, a valve normally admitting pressure fluid to the cylinder to maintain the brakes released, but capable, when shifted, of cutting off supply to the cylinder while permitting simultaneous discharge of the cylinder to the atmosphere when the brakes are to be applied, and a fly-ball governor control co-ordinated with the propeller shaft of the vehicle for suspending operation of the motor and at the same time causing automatic application of the brakes when a predetermined rate of vehicular speed is attained.

8. In a motor vehicle, the combination of a storage tank, a compressor for maintaining a constant supply of fluid pressure therein, a cylinder having a piston adapted to be operated by the fluid under pressure and functional to control the brakes, both ends of said cylinder being normally under pressure to maintain said piston in a neutral position with the brakes released; and means for automatically exhausting one end of the cylinder thereby permitting the pressure in the other end to act upon the piston to apply the brakes and concurrently cut off the motive power when a predetermined vehicular speed is attained.

In testimony whereof, I have hereunto signed my name at Philadelphia, Pennsylvania, this 5th day of July 1923.

JOHN J. BROPHY.